Dec. 5, 1967     J. DAUGHERTY     3,355,799
ENCLOSURE FOR AUTOMATIC TOOL CHANGER AND MACHINE TOOL
Filed Sept. 19, 1966     5 Sheets-Sheet 1
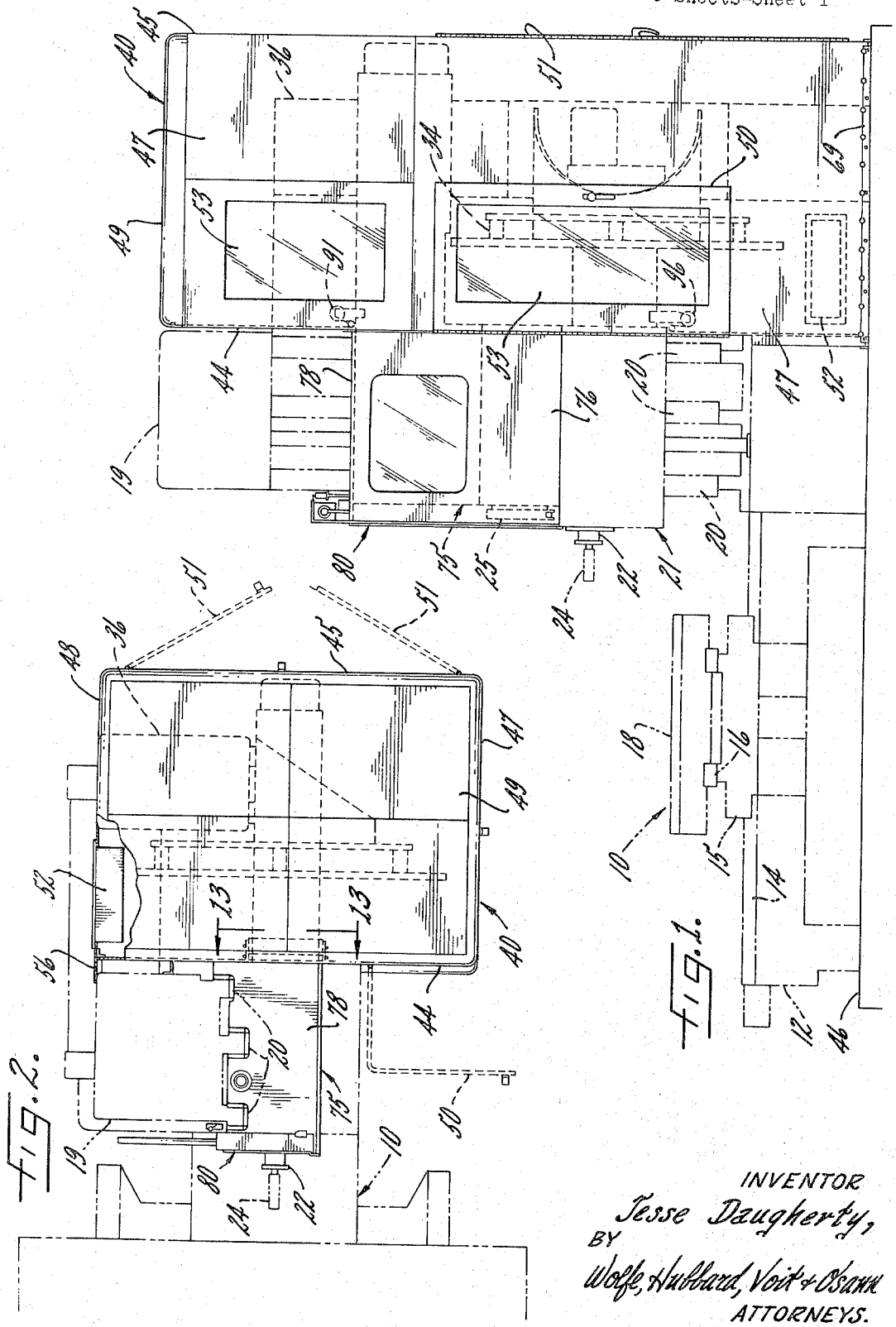
INVENTOR
*Jesse Daugherty,*
BY
*Wolfe, Hubbard, Voit & Osann*
ATTORNEYS.

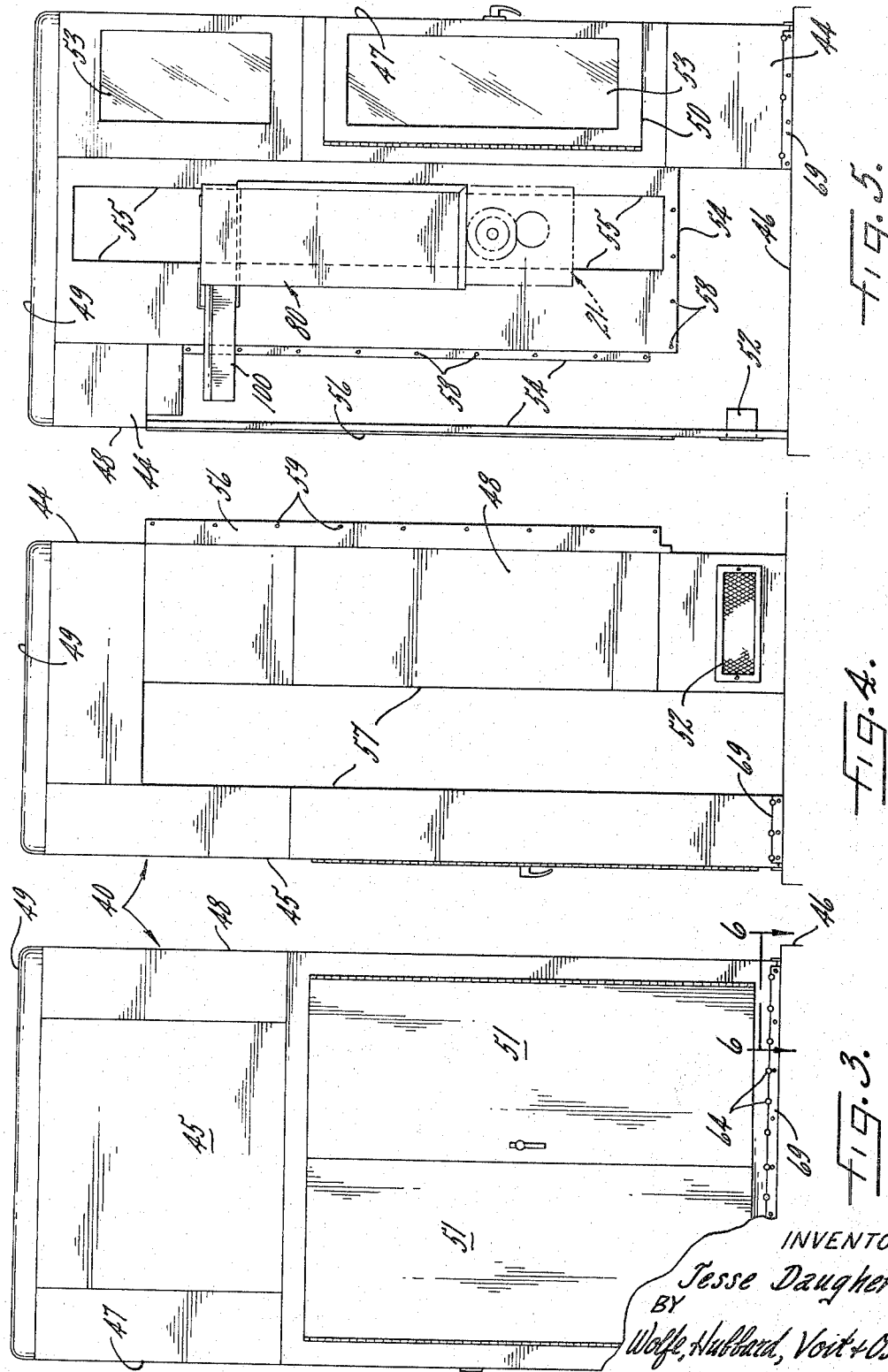

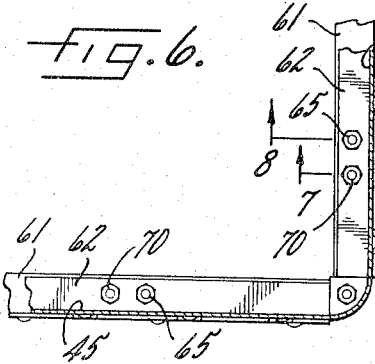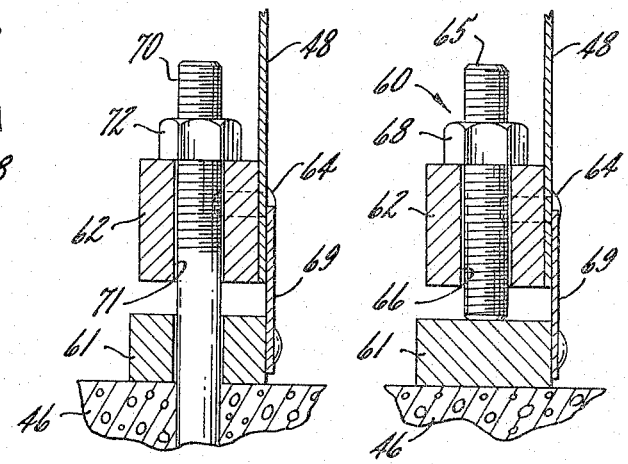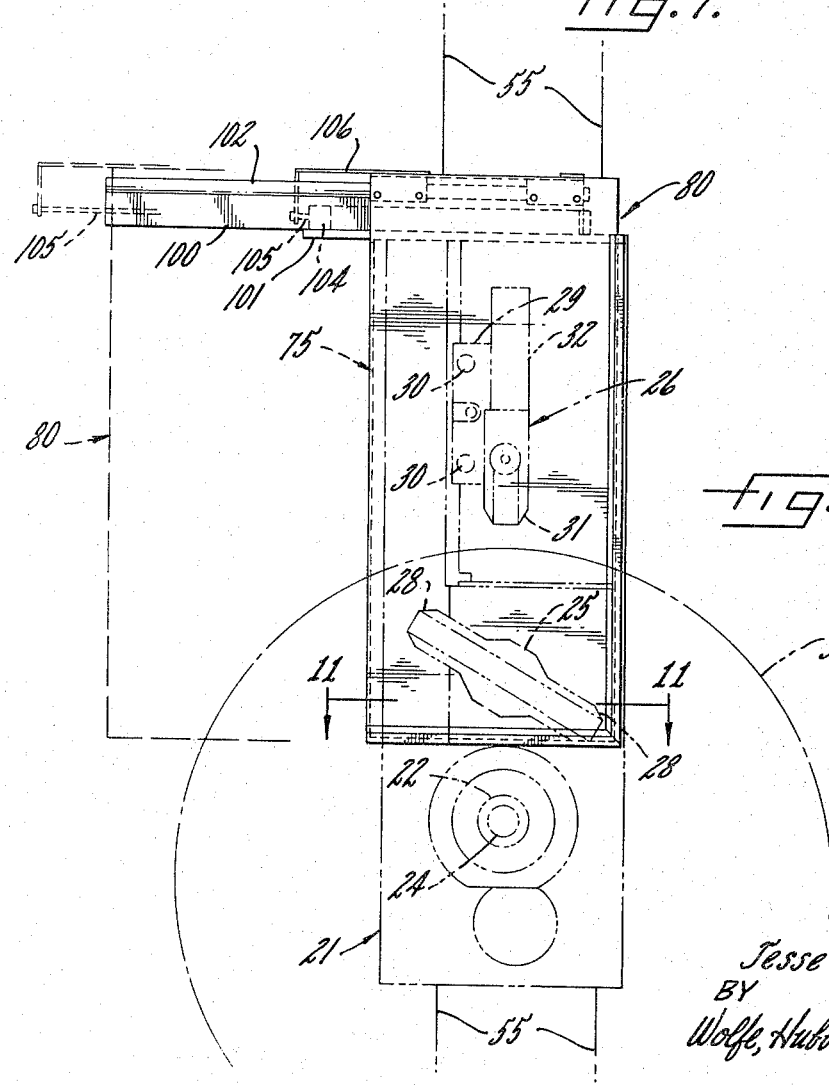

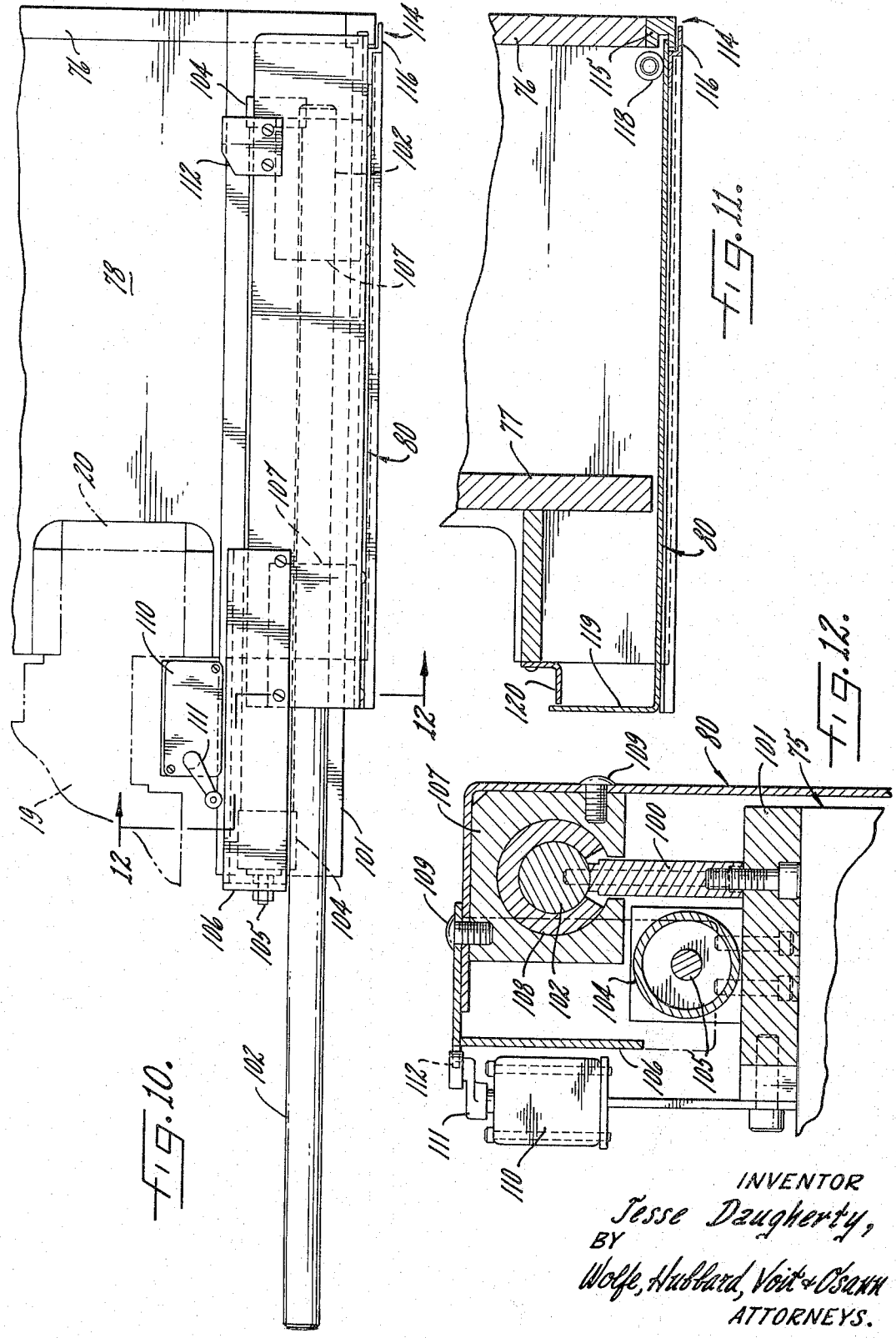

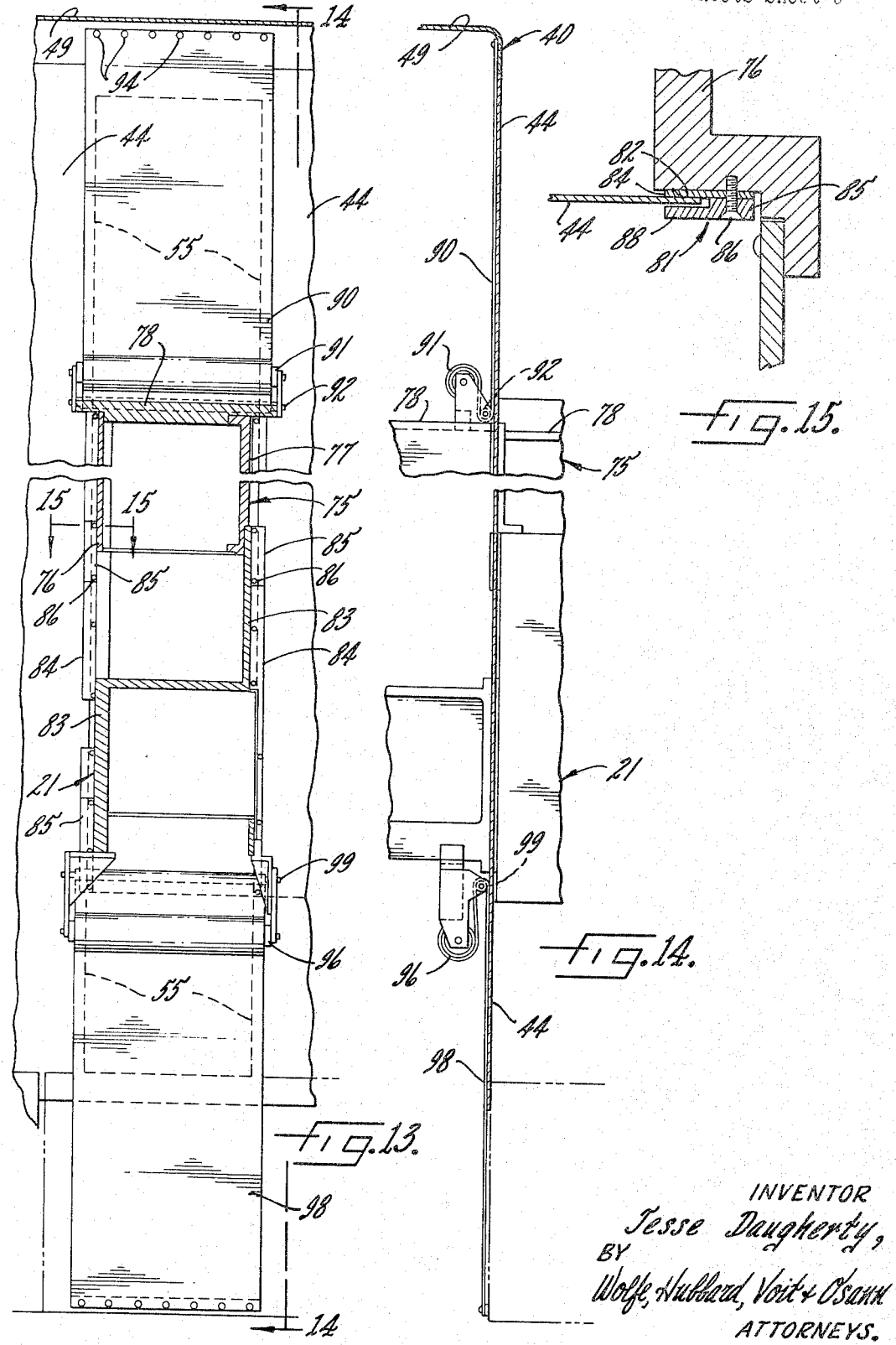

United States Patent Office 3,355,799
Patented Dec. 5, 1967

3,355,799
ENCLOSURE FOR AUTOMATIC TOOL
CHANGER AND MACHINE TOOL
Jesse Daugherty, Hollywood, Fla., assignor to Giddings
& Lewis Machine Tool Company, Fond du Lac, Wis.,
a corporation of Wisconsin
Filed Sept. 19, 1966, Ser. No. 580,413
14 Claims. (Cl. 29—568)

The present invention relates to automatic tool changing apparatus for horizontal boring, drilling and milling machines, and more particularly to a structure for enclosing the tool changing apparatus of such machines.

Precision machine tools require for proper operation that the adapter shanks of their associated tool holders be kept free of foreign particles that might disturb the accuracy of the fit between the tool shank and the mating surface in the tool spindle. In manually controlled machines, it is the customary duty of the machine operator to see that the shank surfaces are perfectly clean. The machine operator normally takes precautions to store unused tools in such manner that they are protected from accumulations of shop dust and flying chips. In addition, the operator usually wipes the shank surface clean with his hand or a cloth just prior to insertion of the shank into the machine spindle.

Automatic tool changing machines eliminate the machine operator from the machining cycle. Moreover, automatic tool changing systems, particularly those applied to large horizontal boring, drilling and milling machines, require complicated transfer mechanisms and tool storage matrices which are subject to accumulations of foreign material that would eventually interfere with their operation.

With the foregoing in mind, it is the general object of the present invention to provide an enclosure for the automatic tool changing apparatus of a machine tool that protects the tool storage matrix and transfer mechanism of the apparatus so as to prevent the entry of dust and foreign material therein, yet permits the apparatus to execute the automatic tool change cycle without encumbrance.

Another object of the invention is to provide an enclosure of the character set forth comprising a substantially unitized and free standing cabinet assembly adjustably mounted in surrounding relation with the automatic tool changing apparatus of the machine tool and including means for pressurizing the interior thereof to preclude entry of dust, chips and foreign material incident to a machining operation.

A further object is to provide an enclosure of the foregoing type including a member automatically controlled to be opened and closed in timed relation with the tool change cycle to permit entry of a tool into, or exit of a tool from, the enclosure.

Still another object of the invention is to provide an enclosure of the character set forth including a flexible closure means adapted to seal the junction between fixed portions of the enclosure and movable portions of the machine tool and which partially relies upon air pressure within the enclosure to maintain its seal.

Other objects and advantages will become apparent as the following description proceeds, taken in conjunction with the accompanying drawings, in which:

FIGURE 1 is an elevational view of an automatic tool changer enclosure exemplifying the present invention, the enclosure being mounted in position about a tool changer of a horizontal boring, drilling and milling machine which is shown in phantom;

FIG. 2 is a plan view of the illustrative enclosure and machine tool shown in FIG. 1;

FIG. 3 is a rear elevational view of the enclosure shown in FIG. 1;

FIG. 4 is a side elevational view of the enclosure shown in FIG. 1;

FIG. 5 is a front elevational view of the enclosure shown in FIG. 1;

FIG. 6 is an enlarged fragmentary horizontal sectional view taken in the plane of line 6—6 in FIG. 3;

FIGS. 7 and 8 are further enlarged fragmentary sectional views taken in the planes of lines 7—7 and 8—8, respectively, in FIG. 6;

FIG. 9 is an enlarged elevational view of the sliding door enclosing the transfer mechanism with the open position of the door being shown in phantom;

FIG. 10 is an enlarged plan view of the sliding door shown in FIG. 9 and the support track upon which the door rides;

FIG. 11 is a fragmentary sectional view taken in the plane of the line 11—11 in FIG. 9;

FIG. 12 is a fragmentary vertical sectional view taken in the plane of line 12—12 in FIG. 10;

FIG. 13 is a fragmentary vertical sectional view taken in the plane of line 13—13 in FIG. 2 showing flexible sealing curtains and their rollers mounted within the enclosure above and below the headstock of the machine;

FIG. 14 is a fragmentary sectional view taken in the plane of line 14—14 in FIG. 13;

FIG. 15 is an enlarged fragmentary sectional view taken in the plane of the line 15—15 in FIG. 13 showing the seal between the side of the headstock and the enclosure cabinet.

While the invention is susceptible of various modifications and alternative forms, a certain specific embodiment thereof is shown by way of example in the drawings and will herein be described. It should be understood, however, that it is not intended to limit the invention to the particular form disclosed, but, on the contrary, the intention is to cover all modifications, equivalents and alternatives falling within the spirit and scope of the invention as expressed in the appended claims.

Referring more specifically to FIGS. 1 and 2, there is shown in phantom an illustrative horizontal boring, drilling and milling machine 10 equipped with an automatic tool changing mechanism 11. The machine 10 includes a bed 12 having guideways 14 on its top surface which support a saddle 15 for longitudinal sliding movement thereon. The saddle 15, in turn, has crossways 16 which support a work table 18 for transverse sliding movement. At one end of the bed, there is an upstanding column 19 formed with vertical guideways 20. A headstock 21 having a generally rectangular housing is supported on the guideways 20 for vertical translation on the column. An extensible power driven spindle 22, rotatably and translatably supported in the headstock 21, is adapted to receive and drive a tool 24.

The automatic tool changing mechanism 11 incorporated in the machine may, for example, be of the type disclosed in Jesse Daugherty U.S. application Ser. No. 344,931, filed Feb. 14, 1964, now patent No. 3,300,856. As shown in FIG. 9, the tool changing apparatus 11 in this instance includes a transfer arm 25 mounted for axial and rotary motion on the headstock 21 directly above the tool spindle 22. The transfer arm 25 may be axially shifted from a nonoperating position shown in FIG. 1 to an extended position in a plane above the tool 24. The arm 25 is provided at its ends with identical tool gripping devices 28.

Above the rotary arm 25 is a linear transfer mechanism 26, also supported by the headstock 21. The linear transfer mechanism 26 includes a shuttle 29 mounted for horizontal movement along a pair of vertically spaced guide bars 30. The shuttle has a depending tool gripping device 31 mounted on a vertical slide 32.

A tool storage matrix 34, shown in FIG. 1, holds a plurality of tools in storage for use in the headstock spindle 22. The matrix 34 is rotatably supported on the machine and is adapted to be indexed so as to present any selected tool to the transfer mechanism 26.

The illustrative boring, drilling and milling machine 10 equipped with the tool changing apparatus 11 is adapted to automatically perform a series of machining operations with interspersed tool changing operations. Automatic operation may be effected by numerical control from a source of command signals derived, for example, from a magnetic or punched paper tape through a control system connected to operate the various power driven components of the machine.

At the start of the tool changing cycle, the matrix 34 is indexed so as to bring a predetermined tool into position to be secured by the gripping device 31 of the shuttle 29. The shuttle 29 is then moved along its guiderails 30 away from the matrix 34, withdrawing the selected tool from the matrix 34 and transferring it to a position above the rotary transfer arm 25 which has moved axially outward from the headstock 21.

During this time, the spindle 22 carrying the old tool also is shifted axially outward from the headstock 21 so as to be substantially coplanar with the tool held by the shuttle 29. The tool exchange arm 25 is then revolved so as to secure the old tool at one end and the new tool at the opposite end. The shuttle 29 then releases the new tool, the spindle 22 retracts, and the arm 25 rotates 180° to the exchange tools. The new tool from the shuttle is thus carried in an arcuate path to a position for insertion into the spindle 22 which advances axially, while the old tool is carried by the opposite end of the arm 25 in an arcuate path and presented to the shuttle. The shuttle 29 thereupon returns the old tool to the matrix 34, and the spindle 22 and transfer arm 25 retract toward the headstock 21.

In accordance with the invention, an enclosure is provided completely containing the tool storage matrix, the linear transfer mechanism, and the rotary arm so as to prevent the entry and accumulation of dust or other foreign materials on the tool changing apparatus, yet permitting the apparatus to carry out the tool change cycle without encumbrance. In the illustrated embodiment, the enclosure includes a matrix cabinet 40 and a linear transfer mechanism housing 75. The matrix cabinet 40, which encloses the tool storage matrix 34 and partially contains the columns 19, 36 of the machine, comprises a pair of side panels 47, 48 interconnected by front and back panels 44, 45 all supported on the machine foundation 46. The cabinet is completed by a top panel 49 joining the upper edges of the panels 44, 45, 47, and 48. The cabinet 40 is coextensive in height with the machine column 19 so as to accommodate vertical travel of the matrix 34 and linear transfer mechanism 26 as the headstock 21 is traversed vertically.

In order to provide convenient access to the cabinet interior for the purpose of loading the matrix 34 with selected tools, an L-shaped door 50 is rotatably hinged to the front panel 44 and is adapted to close a corner access opening in the front and side panels 44, 47. The rear panel 45 of the cabinet is provided with hinged double doors 51 giving convenient access for servicing and inspecting the matrix mechanism 34. Preferably, the cabinet 40 is formed so that additional segments of the panels may be conveniently removed in the event of major servicing or overhauling to the machine. The cabinet doors and additional access panels are all provided with sealing gaskets to form a substantially airtight closure.

To permit inspection of the machine without opening the access doors 50, 51, several of the cabinet panels and doors may be formed with glass windows. In the illustrated cabinet, windows 53 are provided in both legs of the L-shaped corner door 50 and also in the front and side panels 44, 47 directly above the corner door 50.

In order to pressurize the interior of the cabinet 40, a blower unit 52 is mounted in the front cabinet panel 47 and is adapted to pull air into the cabinet through a filter. It will be apparent that by making the enclosure substantially airtight, the blower tends to pressurize the enclosure so as to prevent the entry of contaminating materials. It should be appreciated, however, that although a measurable buildup of pressure may not be possible due to the continual opening of the door for the rotary transfer arm or due to other leakage points in the cabinet, the blower still creates an outward flow of air through these openings and thus tends to prevent foreign materials from entering.

To permit the cabinet 40 to receive the column 19, the front panel 44 is formed with an L-shaped opening 54 as shown in FIG. 5. The cabinet 40 is tied to the column 19 by a plate 56 overlapping the column and being secured thereto by screws passing through spaced apertures 59 formed in the plate 56. The front panel 44 similarly is secured to the column along the periphery of the opening 54 by screws passing through apertures 58. The side panel 48 of the cabinet also has an opening 57 within which one side of the column 36 is closely fitted, and the front panel 44 is formed with a vertical opening 55 adapted to accommodate vertical movement of the headstock 21 and the transfer mechanism housing 75.

To facilitate making the cabinet panel opening 55, through which the headstock 21 extends, square and parallel with the headstock traverse, the cabinet structure 40 is provided with a leveling device 60 adapted to compensate for any slight irregularity in the floor or machine platform 46 upon which the cabinet is mounted. The leveling device 60 as shown in FIGS. 6–8 includes a plate 61 which rests directly on the floor and extends around the periphery of the cabinet 40. The lower peripheral edge of the cabinet is provided with a heavy flange 62 secured to the cabinet panels by screws 64. A series of leveling screws 65 are in threaded engagement with the flange 62 and vertically bear against the plate 61 so as to cause the flange 62 and the lower edge of cabinet panels to be elevated a distance above the plate 61. The leveling screws 65 may be adjusted to provide the desired separation between the flange 62 and plate 61 so as to properly align the cabinet. A nut 68 threaded on each leveling screw 65 serves to lock the leveling device at its adjusted position. In order to cover the space between the flange 62 and the plate 61 to prevent the entry of foreign materials into the cabinet while also permitting vertical adjustment of the cabinet, a sheet metal plate 69 is secured to the outer edge of the plate 61 and extends up in close overlapping contact with the outer wall of the cabinet.

The flange 62 of the leveling device may be additionally used to rigidly fasten the cabinet 40 to the platform 46 as shown in FIG. 7. A hold-down bolt 70 is fixed to the platform and extends up through a hole 71 in the flange 62 adjacent each of the leveling screws 65. A nut 72 threaded on the bolt 70 thus locks the cabinet to the platform.

In the illustrated embodiment, the housing 75 for the tool transfer mechanism 26 and rotary arm 25 comprises side panels 76, 77 extending up from the top of the headstock 21, a top panel 78 connecting the side panels 76, 77 and extending to the column 19, and a closure member or door 80 flush with the front of the headstock and enclosing the front of the transfer mechanism. The backside of the transfer mechanism 26 is partially enclosed by a panel member on the headstock 21 (FIGS. 2, 14), the latter also enclosing the bottom of the mechanism.

In carrying out the invention, the headstock 21 and transfer mechanism housing 75 are sealed within the opening 55 in the front panel by a sealing means adapted to accommodate vertical movement of the headstock and housing. As shown in FIGS. 13–15, the vertical sides of the headstock 21 and the vertical edges of the opening 55 are sealed by a labyrinth seal 81. The side walls 76, 77 of the housing 75 and sidewalls 83 of the headstock 21 are each formed with a shoulder 82 upon which is mounted a vertically extending plate 84. The plate 84 is held against the shoulder 82 by a mounting plate 85 secured to the shoulder by screws 86. The mounting plate 85 is formed with a leg 88 which defines a channel with plate 84, within which fits the vertical edge of the front panel 44 adjacent the opening 55. Thus, when the headstock 21 traverses within the opening 55, the sides of the headstock and housing ride on the edges of the panel opening and the close interconnection of these parts serves as a seal.

In order to seal the opening 55 above and below the headstock, which varies as the headstock 21 moves vertically, a flexible curtain carried on a spring-loaded roller is provided on opposite sides of the headstock 21 and housing 75 within the cabinet. Mounted on top of the housing 75 is a spring roller 91 carrying a curtain 90 (FIGS. 13, 14) that is guided under an idler 92 and fixably attached in the top of the opening 55 by fasteners 94. The idler 92 and fasteners 94 support the played out section of the curtain so that it lies closely adjacent and overlaps the edges of the opening 55. In a similar manner, a second roller 96 is supported on the underside of the headstock 21. A curtain 98 (FIGS. 13, 14) carried by the roller is guided by an idler 99 and fastened to the lower edge of the panel 44 so that the curtain covers the opening 55 below the headstock. The curtains 90, 98 may be made from rubberized fabric or any of a wide variety of flexible sheet materials.

As the headstock is vertically translated, one curtain is pulled from its roller to cover the increasing opening on its side of the headstock, while the spring-loaded roller on the opposite side of the headstock automatically winds the curtain as the opening is reduced. It should be appreciated that in addition to the idlers 92, 99, the air pressure within the cabinet created by the blower 52 tends to maintain the curtains firmly against the edges of the opening 55 so as to prevent dust and foreign materials from entering.

In accordance with another aspect of the invention, the closure member or door 80 covering the front of the transfer mechanism housing 75 is adapted to be automatically opened and closed in timed relation with the tool change cycle so as to permit unencumbered entry of a tool into, or exit of a tool from, the tool changer enclosure. In the illustrated embodiment shown in FIGS. 9–12, the door 80 is slidably supported on a horizontal track 100 carried at the top of the housing 75 by an elongated bracket 101. The track 100 includes a cylindrical rod 102 supported along the top surface of the track. To facilitate movement of the door along the track 100, bushings 108 held in housings 107 secured to the top edge of the door 80 by screws 109 support the door on the cylindrical rod 102. In order to move the door 80 along the track 100 and rod 102, a fluid actuating cylinder 104 is fixed to the bracket 101 and has a piston rod 105 attached to a bracket extension 106 on the door 80. When the cylinder 104 is actuated by fluid pressure so that piston rod 105 is forced outward, the door 80 slides along the track 100 causing the housing 75 to be opened so that the shuttle 29 and the transfer arm 25 may be extended beyond the boundaries of the enclosure and into position for a tool change.

In order to automatically close the door after the tool changing operation is completed, a limit switch 110 having a lever 111 is carried on the bracket 101 and is adapted to cooperate with a cam 112 on the door when the door reaches its completely open position. When the cam 112 activates the limit switch 110 by striking the lever 111, fluid pressure within the cylinder is reversed after a predetermined time interval, causing the door again to be closed.

When the door 80 is in the closed position, the rotary arm and transfer mechanism are sealed within the housing 75. In the illustrated embodiment, when the door is closed one vertical edge of the door is sealed by a labyrinth seal 114. The seal includes a channel 115 secured to the side panel 76 of the housing 75, and the edge of the door is formed with spaced flanges 116 adapted to receive the outer edge of the channel 115. A cam roller 118 serves to force the vertical door edge into sealing contact with the channel when in the closed position. Preferably, the bottom edge of the door rides on a similar channel mounted in the housing. The other vertical edge 119 of the door is sealed by a strip 120 abutting the door, while the top door edge may be sealed by an overlapping fit with the bracket 101.

As can be seen from the foregoing detailed description, the structure described herein provides an enclosure which isolates the tool changing mechanism and tools stored therein from direct exposure to shop atmosphere and flying chips during the machine operation. The shuttle and transfer arm grippers, which have precision grip surfaces, are protected from exposure to dirt and foreign materials as are the complex mechanisms of the tool transfer mechanism and matrix.

Moreover, the structure provided by this invention serves to guard the tool changing apparatus so as to reduce the danger of injury to the machine attendant. The structure also enhances the machine's appearance and makes housekeeping chores, about the machine much simpler.

I claim as my invention:

1. In a machine tool having a spindle and an automatic tool changing apparatus including a tool storage matrix and means for transferring tools between said matrix and said spindle, the combination comprising an enclosure mounted in surrounding relation with said matrix and transfer means so as to prevent chips and foreign material from entering into and accumulating upon the tool changing apparatus, and an automatically controlled closure member adapted to be opened and closed in timed relation with tool changer cycle to permit entry of a tool into, or exit of a tool from, said enclosure.

2. The automatic machine tool apparatus enclosure of claim 1 in which said enclosure includes an access door adapted to be opened to permit entry into the interior of said enclosure for loading said tool storage matrix and servicing said tool transfer apparatus.

3. The subject matter of claim 1 in which said automatically controlled closure member is a door slidably supported by said enclosure and adapted to be automatically opened and closed in timed sequence with the tool changing operation.

4. The subject matter of claim 1 in which said enclosure includes a horizontal track upon which said automatically controlled member is slidably supported, a hydraulic actuating cylinder having a piston rod secured to said member and said member being adapted to be slidably opened and closed in timed relation with the tool changing cycle in response to actuation of said cylinder.

5. The subject matter of claim 1 in which said automatically controlled member is a door, and said enclosure includes a horizontal track upon which said door is slidably supported, a hydraulic actuating cylinder having a piston rod secured to said door, said door being slidably opened in response to actuation of said cylinder so as to permit axial movement of said rotary arm outside said enclosure during tool changing operations, a limit switch carried by said enclosure adapted to be actuated when said door reaches its open position, said door being slidably closed by said cylinder in response to actuation of said limit switch after the tool changing operation is completed, and said door being held in sealing contact with said enclosure when in the closed position.

6. In a machine tool having a spindle mounted in a vertically translatable headstock and an automatic tool changing apparatus including a transfer mechanism, an axially movable rotary transfer arm, and a tool storage matrix, the combination comprising a matrix cabinet having a pair of side panels interconnected by front, back and top panels enclosing said tool storage matrix so as to prevent the entry of foreign materials, a transfer mechanism housing formed above said headstock enclosing said transfer mechanism and rotary arm, and said housing including a door adjacent said rotary tool transfer arm adapted to be opened automatically in timed sequence with the tool changing cycle to permit axial movement of said arm outside said housing during tool changing operations.

7. The subject matter of claim 6 in which a horizontal track is supported by said headstock upon which said door is slidably disposed, a hydraulic actuating cylinder having a piston secured to said door, and said door being adapted to be slidably opened and closed in timed sequence during the tool changing cycle in response to actuation of said cylinder.

8. The subject matter of claim 6 in which a blower mounted in one of said panels is adapted to pull filtered air into said cabinet, and one of said cabinet panels includes an access door adapted to be opened to permit entry into the interior of said cabinet for loading said tool storage matrix and servicing said tool changing apparatus.

9. The subject matter of claim 6 in which said front cabinet panel is formed with an opening adapted to receive said headstock and transfer mechanism housing and accommodate vertical movement thereof relative to said cabinet, and means for sealing said headstock and housing within said opening while accommodating said vertical movement.

10. The subject matter of claim 9 in which said means for sealing said headstock and housing within said opening includes a spring loaded roller mounted below said headstock within said cabinet carrying a roll of flexible curtain adapted to be unrolled against the force of said spring roller, said flexible curtain being secured at one end to said cabinet so as to lie closely adjacent and cover the portion of said opening below said headstock, a second spring loaded roller mounted above said headstock and housing carrying a second flexible curtain adapted to be unrolled against the force of said roller, said second flexible curtain being secured at one end to said cabinet so as to lie closely adjacent and cover the portion of said opening above said headstock and housing, and said rollers being adapted to automatically take in or play out said curtain as said headstock and housing are moved vertically within said opening so as to maintain a tight cover over said opening and seal the cabinet from the entry of foreign materials.

11. The subject matter of claim 10 in which a blower is mounted in one of said panels and is adapted to pull filtered air into said cabinet so as to tend to pressurize said cabinet and housing, and said curtains are held firmly against said panel opening by said pressurized air.

12. For use with an automatic machine tool having a vertically translatable headstock and automatic tool changing apparatus including a tool storage matrix, a transfer mechanism, and an axially movable rotary transfer arm, the combination comprising a cabinet enclosing said tool storage matrix so as to prevent the entry of foreign materials, a transfer mechanism housing formed above said headstock enclosing said transfer mechanism and rotary arm, said housing including a door adapted to be automatically opened and closed in timed relation with the tool changing cycle so as to permit axial movement of said rotary arm outside said housing, said cabinet having an opening adapted to receive said headstock and transfer mechanism housing and accommodate vertical movement thereof relative to said cabinet, means sealing said headstock and housing within said opening while accommodating said vertical movement, a blower mounted in said cabinet and adapted to pressurize the same, and said cabinet having an access door adapted to be opened to permit entry into the interior of said cabinet for loading said tool storage matrix and servicing said tool changing apparatus.

13. The subject matter of claim 12 in which said cabinet has a leveling means for vertically adjusting said cabinet so as to insure that said headstock and closure are properly positioned within said front panel opening.

14. The subject matter of claim 12 in which said machine is supported on a platform, and said leveling means includes a plate resting on said platform completely surrounding the lower periphery of said cabinet panels, a flange secured to the lower edge of said cabinet panels, a series of leveling screws in threaded engagement with said flange and vertically bearing against said plate so as to cause said flange and the lower edge of said panels to be elevated a distance above said plate, said screws being vertically adjustable to vary the separation between said flange and plate, and a vertical cover panel secured to said plate extending up in close overlapping contact with said cabinet panels so as to cover the space between said plate and the lower edge of said panels to seal said cabinet from the entry of foreign materials.

No references cited.

RICHARD H. EANES, JR., *Primary Examiner.*